Sept. 10, 1968     A. L. SMARKER     3,400,750
RAIN CANOPY FOR AUTOMOBILE WINDSHIELDS
Filed Aug. 15, 1966
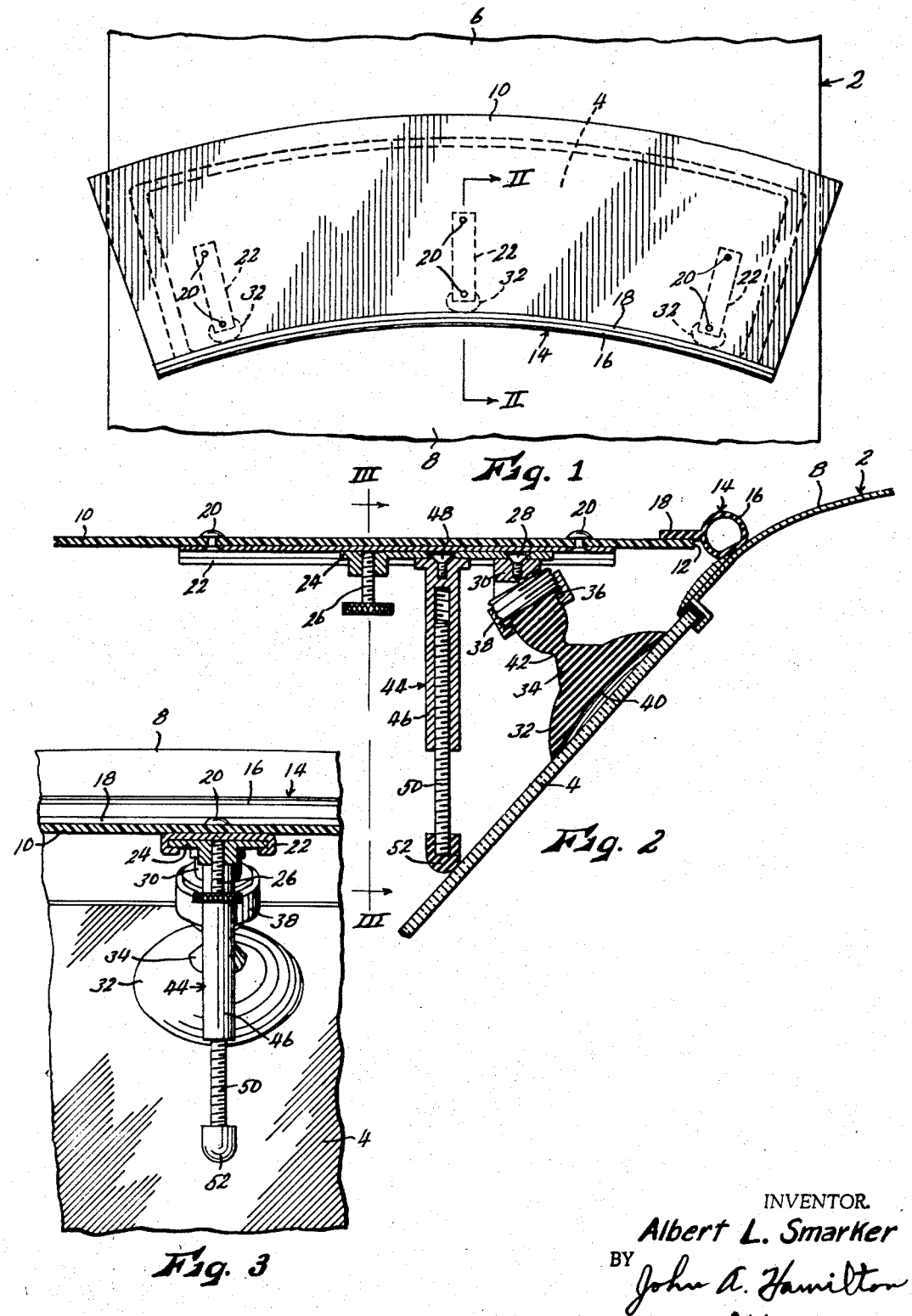
INVENTOR.
Albert L. Smarker
BY John A. Hamilton
Attorney.

United States Patent Office 3,400,750
Patented Sept. 10, 1968

3,400,750
RAIN CANOPY FOR AUTOMOBILE
WINDSHIELDS
Albert L. Smarker, 2522 Cissna,
Kansas City, Kans. 66104
Filed Aug. 15, 1966, Ser. No. 572,389
2 Claims. (Cl. 160—368)

ABSTRACT OF THE DISCLOSURE

A rain canopy for automobile windshields consisting of a flexible waterproof sheet adapted to extend horizontally over the windshield with its rearward edge having a compressible sealing member adapted to engage the automobile, a plurality of suction cups secured pivotally to said sheet beneath and adjacent the rearward edge thereof to engage the windshield, and an adjustable strut carried by said sheet forwardly of each suction cup and extending downwardly to engage the windshield below said suction cup.

---

This invention relates to new and useful improvements in accessories for automobiles, and has particular reference to a canopy or protector adapted to prevent rain from striking the windshield when the automobile is motionless. It is intended primarily for use at drive-in theaters, in order to prevent the rain from obscuring vision through the windshield, without requiring the use of the usual windshield wipers.

The principal object of the present invention is the provision of a rain canopy of the character described consisting of a generally planar canopy adapted to be connected at its rearward edge to the automobile generally at the upper edge of the windshield and to project generally horizontally forwardly therefrom to overhang the entire horizontal span of the windshield.

Another object is the provision, in a rain canopy of the character described, of a novel mounting means for securing the canopy to the automobile, and having the functions of accommodating the rearward edge of the canopy to automobiles having various different contours, or providing a seal to prevent leakage of rain water between the automobile and the rearward edge of the canopy, and of accommodating the canopy for use on windshields having different forms and proportions, both as to vertical slope and transverse curvature.

The invention may be summarized as the provision of a windshield rain canopy consisting of a flexible waterproof sheet adapted to extend horizontally over a windshield, and having a resiliently compressible seal along the rearward edge thereof for engaging the automobile, the flexibility of said sheet allowing said seal to conform to the contour of the automobile, a plurality of suction cups secured to the sheet adjacent its rearward edge for engaging the windshield itself to mount the canopy, said cups being universally mounted on the sheet whereby to conform to the attitude of the windshield surface, and a rigid trut secured to the sheet forwardly of each suction cup and extending downwardly to rest on the windshield, whereby to support the sheet against movement on the universal mountings of said cups, compress said seal against movement on the universal mountings and to compress said seal against the automobile. Also, the cups are adjustable forwardly and rearwardly, and the struts are adjustable in length, to adapt the canopy for use on windshields having different degrees of vertical slope.

With these obpects in view, as well as other objects which will appear in the course of the specification, reference will be had to the accompanying drawing, wherein:

FIG. 1 is a fragmentary top plan view of an automobile showing the windshield and adjacent portions thereof, with a rain canopy embodying the present invention mounted operatively thereon, FIG. 2 is an enlarged fragmentary sectional view taken on line II—II of FIG. 1, with parts left in elevation and partially broken away, and FIG. 3 is a fragmentary sectional view taken on line III—III of FIG. 2.

Like reference numerals apply to similar parts throughout the several views, and the numeral 2 applies generally to an automobile, most of the details of which have been omitted, the windshield being shown at 4, with the hood 6 extending forwardly from the lower edge thereof, and the roof 8 extending rearwardly from the upper edge thereof. The windshield normally is sloped or inclined downwardly and forwardly as indicated in FIG. 2, and is forwardly convexly curved in a horizontal plane as indicated in FIG. 1, although the precise pattern of curvature is subject to considerable variation in different automobiles, as is the degree of vertical slope.

The rain canopy forming the subject matter of the present invention includes a planar sheet 10 of flexible plastic or other suitable waterproof material of sufficient width to extend substantially the full width of the automobile. The sheet is of sufficient strength to be self-supporting between its support points, but nevertheless is flexible normally to its plane. Its rearward edge 12 is concavely curved to conform generally to the horizontal curvature of the top edge of the windshield, and has attached thereto a sealing device 14 consisting of a continuous hollow tube 16 of soft rubber or the like having formed integrally therewith a continuous flange 18 which is cemented or otherwise permanently affixed to the rearward edge of sheet 10. Said seal extends the full length of said rearward edge, as is adapted to engage the automobile roof 8 just above the windshield, or in some cases the upper edge of the windshield itself, with sheet 10 extending generally horizontally forwardly therefrom. Said sheet in this position has sufficient area to overhang the entire horizontal span of the windshield, to protect said windshield from rain.

Affixed to the lower surface of sheet 10, as by rivets 20, are a plurality of guide channels 22. As shown, there are three such channels, one at the midpoint thereof and one adjacent each side thereof, although a different number could be used if so desired. Each of said channels is disposed adjacent the rearward edge of sheet 10, and is elongated in a direction normal to said rearward edge, being formed of rigid metal. Mounted in each of said guide channels is a slide plate 24, being retained in said channel for forward and rearward sliding movement by the C-shaped configuration of said channel, and being releasably fixable at any desired position in said channel by a set screw 26. Affixed to the rearward end portion of each slide 24, as by screw 28, is a downwardly and rearwardly angled stud 30. A rubber suction cup 32 adapted to engage the outer surface of windshield 4 is carried by said stud, said cup being provided with an integral stem portion 34 having at its opposite end a flange 36 (see FIG. 2) secured to stud 30 by a threaded union ring 38. The angle of stud 30 is such that the operative concave face 40 of the cup will normally be inclined at an angle corresponding perhaps to the average vertical slope of automobile windshields when sheet 10 is disposed horizontally. However, as noted above, this slope varies from car to car, and to permit the cup to accommodate itself to windshields of different slopes, the stem 34 thereof is provided with a reduced neck 42. Being formed of resilient rubber or the like, this neck permits a relatively free universal pivoting of the cup with respect to stud 30, in much the same manner as a ball-and-socket joint. Such a ball-and-socket joint could, in fact, be used in the present structure within the scope of the invention. The transverse curvature of the windshield is sufficiently gradual that it does not prevent the suction cups from being mounted thereon.

A strut 44, which is generally vertical, is mounted on each slide 24 just forwardly of stud 30. Said strut comprises an internally threaded tube 46 secured at its upper end to slide 24, as by screw 48, and an elongated screw 50 threaded in said tube to project downwardly therefrom, and provided at its lower end with a rubber foot 52 adapted to rest on the windshield just below the associated suction cup 32. The length of the strut is rendered adjustable by threading screw 50 into tube 46 to varying degrees.

In applying the canopy to an automobile, the sheet 10 is first placed in the general position desired, with seal strip 14 engaging the automobile body just above the windshield as shown, and projecting generally horizontally forwardly. In some cases, as where the roof structure projects somewhat forwardly to overhang the top edge portion of the windshield, it may be necessary to engage the seal 14 directly on the windshield glass, along the upper edge thereof. While the curvature of rearward edge 12 of sheet 10, and hence of sealing member 14, is such as to allow the seal to engage the "average" automobile continuously when the sheet is horizontal, it obviously cannot, when horizontal, have continuous contact with automobiles having somewhat different contours. However, the pertinent surfaces of the automobile, i.e. the windshield and adjacent portion of the roof, virtually always have a sufficient horizontal component that the seal may be brought into continuous contact therewith by flexing sheet 10 vertically, or normally to its generally horizontal plane. Then set screws 26 are loosened and slides 24 are moved forwardly or rearwardly as may be necessary to allow suction cups 32 to be operatively engaged with the windshield surface, as shown, while sheet 10 remains generally horizontal. Steeper or more nearly vertical windshields will require slides 24 to be moved relatively far to the rear, while flatter or more nearly horizontal windshields will require the slides to be moved relatively far forwardly. Set screws 26 are then tightened, and suction cups 32 pressed firmly against the windshield to be adhered thereto by air pressure in the usual manner, the universal pivot characteristic provided by neck 42 of the suction cup permitting the concave face 40 thereof to adjust itself to windshields of different slopes and configurations.

Struts 44 are then lengthened, by turning screws 50 downwardly in tubes 46, as may be necessary to cause feet 52 of said struts to engage the windshield just below the respective suction cups. The struts thus support the canopy sheet 10 firmly in its general horizontal plane despite the universal flexibility of necks 42, and also tend to pivot the rearward edge of sheet 10 downwardly, about necks 42 as fulcrums, whereby to compress or yieldably deform the hollow rubber tube 16 of seal 14 against the automobile, whereby to prevent the passage of water therebetween. Otherwise any water passing therebetween would run down the surface of the windshield and defeat the main objective of the invention, which is to preserve and maintain clear vision through the windshield during rain showers, when the automobile is parked as at drive-in theaters and the like. Once all of the adjustments as described have been made to adapt the canopy to a particular automobile, said adjustments may be left unchanged, and the canopy thereafter applied to or removed from said automobile with great speed and ease. In other words the adjustments, namely the positioning of slides 24 annd the length of struts 44 need be made only when applying the canopy to a given automobile for the first time. When not in use, the canopy may be stored in the automobile trunk if desired. To facilitate storage in this manner, sheet 10 may be formed in hingeably connected sections to permit folding thereof to occupy less space, although this particular arrangement is not illustrated in the drawing.

In summary, the invention consists not only in the provision of a protective canopy for automobile windshields, which per se is probably not novel except for the particular usage and application thereof herein discussed, but also and more specifically of the provision of a novel mounting means for such a canopy whereby it may be applied and removed easily and rapidly, which does not require modification or change of any sort in the automobile itself, which is readily adjustable for use with automobiles of a wide variety of styles and contours, and which provides an effected water seal between the automobile and the rearward edge of the canopy.

While I have shown and described a specific embodiment of my invention, it will be readily apparent that many minor changes of structure and operation could be made without departing from the spirit of the invention as defined by the scope of the appended claims.

What I claim as new and desired to protect by Letters Patent is:

1. A rain canopy for automobile windshields comprising:
    (a) a planar canopy sheet adapted to be disposed horizontally with its rearward edge engaging said automobile adjacent the upper edge of the windshield thereof and extending forwardly to overhang the entire area of said windshield,
    (b) a series of suction cups disposed beneath said sheet in forwardly spaced relation from the rearward edge thereof and at laterally spaced apart points therealong,
    (c) a vertical strut of adjustable length disposed beneath said sheet forwardly of each of said suction cups and extending downwardly to rest at its lower end against said windshield forwardly of the associated suction cup, and
    (d) mounting means attaching each of said suction cups, and its associated strut, on said sheet, said mounting means comprising a single slide member on which both said suction cup and said strut are mounted, said suction cup being counted thereon for universal pivotal movement about the axis of the cup, whereby to permit said cup to accommodate itself to engage windshields having variable degrees of vertical slope, a guide member affixed to the lower surface of said sheet, said slide member being mounted in said guide member for movement therein toward or from the rearward edge of said sheet, and means releasably fixing said slide member at any desired position in said guide member.

2. A rain canopy as recited in claim 1 wherein said sheet is formed of flexible material whereby the rearward edge thereof may be brought into continuous engagement with automobiles of different contours by vertical flexure thereof, and with the addition of:
    (a) a continuous, resiliently compressible sealing member mounted along the rearward edge of said sheet, whereby extension of said struts will pivot said sheet about the universal mountings of said suction cups to move the rearward edge of said sheet downwardly to compress said sealing member against said automobile.

References Cited
UNITED STATES PATENTS

| 2,716,572 | 8/1955 | Soucy | 296—95 |
| 2,843,421 | 7/1958 | Shelton. | |
| 2,967,732 | 1/1961 | Richardson. | |
| 3,066,972 | 12/1962 | Transue | 296—95 |

DAVID J. WILLIAMOWSKY, *Primary Examiner.*

P. C. KANNAN, *Assistant Examiner.*